US011509257B2

(12) United States Patent
Shi et al.

(10) Patent No.: US 11,509,257 B2
(45) Date of Patent: Nov. 22, 2022

(54) MOTOR PROTECTOR AND METHOD FOR OPERATING THE SAME

(71) Applicant: Schneider Electric Industries SAS, Rueil Malmaison (FR)

(72) Inventors: Ying Shi, Shanghai (CN); Haijun Zhao, Shanghai (CN); Jiamin Chen, Shanghai (CN); Shuang Sun, Shanghai (CN); Zhangji Zhou, Shanghai (CN); Bing Shuang, Shanghai (CN); Fabien Dechamps, Eybens (FR); Benjamin Edwards, Knightdale, NC (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 21 days.

(21) Appl. No.: 17/138,138

(22) Filed: Dec. 30, 2020

(65) Prior Publication Data

US 2021/0203266 A1 Jul. 1, 2021

(30) Foreign Application Priority Data

Dec. 31, 2019 (CN) .......................... 201911418522.2

(51) Int. Cl.
*H02P 29/032* (2016.01)
*H02P 29/024* (2016.01)
*H02P 29/64* (2016.01)

(52) U.S. Cl.
CPC ........ *H02P 29/032* (2016.02); *H02P 29/0243* (2016.02); *H02P 29/64* (2016.02)

(58) Field of Classification Search
CPC .............................. H02P 29/032; H02P 29/64
(Continued)

(56) References Cited

U.S. PATENT DOCUMENTS 5,657,194 A * 8/1997 Waltz ....................... H02H 3/06
361/75
8,094,426 B2 * 1/2012 Kellis ................. H02H 3/0935
361/109
(Continued)

FOREIGN PATENT DOCUMENTS

EP 2477292 A1 7/2012

OTHER PUBLICATIONS

Extended European Search Report dated Apr. 23, 2021 corresponding to European Patent Application No. 20306702.0, 7 pages.

*Primary Examiner* — David Luo
(74) *Attorney, Agent, or Firm* — Locke Lord LLP

(57) ABSTRACT

A motor protector and a method for operating the same. The motor protector includes: a power supply unit adapted to receive electric power from power supply lines of a motor to power the motor protector; a measuring unit adapted to measure electric parameters of the motor; and a controller configured to at least perform steps of: receiving from the measuring unit the electric parameters; determining, based on the electric parameters, whether the motor experiences a first failure related to overheating of the motor; enabling, in accordance with determination of the first failure of the motor, the power supply unit to power a closing mechanism of the motor protector after a predetermined time, thereby closing the closing mechanism to power the motor by the power supply lines; determining, based on the electric parameters, whether the motor experiences a second failure different from the first failure; and enabling, in accordance with determination of the second failure of the motor, the power supply unit to stop powering the closing mechanism. Hence, the motor protector can discriminate types of the motor failures and adopt corresponding measures for different failures.

16 Claims, 4 Drawing Sheets

(58) Field of Classification Search
USPC .................................................. 318/434, 34
See application file for complete search history.

(56) References Cited

U.S. PATENT DOCUMENTS

| 8,179,083 B2 * | 5/2012 | Cecconi .................... H02P 1/44 |
| | | 318/789 |
| 2008/0048624 A1 | 2/2008 | Davison et al. |

* cited by examiner

MOTOR PROTECTOR AND METHOD FOR OPERATING THE SAME

FIELD

Embodiments of the present disclosure generally relate to a motor protector and more specifically, to a motor protector that receives electric power from power supply lines of a motor. Embodiments of the present disclosure also relate to a method for operating such a motor protector.

BACKGROUND

A motor protector is extensively used in industrial fields to protect the motor. In addition to detecting a failure of the motor, the motor protector, upon detecting the failure, cuts off a contactor in the main circuit of the motor to avoid damaging the motor. Depending on types of the power supply in use, the traditional motor protector is classified into a motor protector powered by an auxiliary power source, i.e., the power is supplied by an additionally provided auxiliary power source, and a self-powered motor protector that receives electric power from its own power supply lines.

Although power supply capacity, start and motor protection operations for the motor protector powered by an auxiliary power source are not affected by load currents of the motor, the users are required to provide an additional power source as well as additional wires on site. Accordingly, the motor protector powered by an auxiliary power source is applicable to certain scenarios only. In contrast, the self-powered motor protector requires no independent auxiliary power sources, which is of significant advantage, and operates, for example, in an unattended place. However, the self-powered motor protector needs receiving the electric power from the power supply lines of the motor, which means that the power supply capacity, start and protection execution of the self-powered motor protector are closely related with the actual load currents of the motor. Consequently, design of such motor protector is more challenging.

The traditional self-powered motor protector is configured to perform a reclosing operation after a predetermined time when the motor experiences a failure. Such an act may cause secondary damage to the motor if the reclosing operation is still performed in the event of open phase or grounding failure of the motor.

SUMMARY

One of the objectives of the present invention is to provide an improved motor protector and a method for operating the same.

According to a first aspect of the present disclosure, there is provided a motor protector. The motor protector comprises: a power supply unit adapted to receive electric power from power supply lines of a motor to power the motor protector; a measuring unit adapted to measure electric parameters of the motor; and a controller configured to at least perform steps of: receiving from the measuring unit the electric parameters; determining, based on the electric parameters, whether the motor experiences a first failure related to overheating of the motor; enabling, in accordance with determination of the first failure of the motor, the power supply unit to power a closing mechanism of the motor protector after a predetermined time, such that the closing mechanism is closed to power the motor via the power supply lines; determining, based on the electric parameters, whether the motor experiences a second failure different from the first failure; and enabling, in accordance with determination of the second failure of the motor, the power supply unit to stop powering the closing mechanism.

In some embodiments of the present disclosure, the second failure includes at least one of grounding-related failure and open phase-related failure of the motor.

In some embodiments of the present disclosure, the power supply unit includes an energy-storage capacitor configured to power the closing mechanism.

In some embodiments of the present disclosure, the motor protector also may comprise: a reclosing unit configured to control the energy-storage capacitor to power the closing mechanism in response to an enabling signal from the controller and to enable the energy-storage capacitor to stop powering the closing mechanism in response to a disabling signal from the controller.

In some embodiments of the present disclosure, the reclosing unit may include an automatic reclosing unit configured to: automatically initiate the energy-storage capacitor to power the closing mechanism after a predetermined time in response to the enabling signal from the controller.

In some embodiments of the present disclosure, the automatic reclosing unit may include a timing circuit that is configured to time by discharging power of the energy-storage capacitor.

In some embodiments of the present disclosure, the motor protector also may comprise: a storage unit configured to store a previous thermal state parameter of the motor when the power supply lines stop powering the motor; and a timing circuit configured to determine a period of time elapsed since the motor is stopped being powered by the power supply lines.

In some embodiments of the present disclosure, the controller is configured to execute an initialization operation in response to start of power supply, to receive the previous thermal state parameter and the period of time elapsed respectively from the storage unit and the timing circuit.

In some embodiments of the present disclosure, the controller is configured to periodically receive the electric parameters and determine whether the failure occurs in the motor.

In some embodiments of the present disclosure, the controller is further configured to: enable, in accordance with determination of at least one of the first failure and the second failure, the power supply unit to power a tripping mechanism of the motor protector, wherein the tripping mechanism, in response to being powered, is configured to stop powering the motor via the power supply lines.

According to a further aspect of the present disclosure, there is provided a method for operating a motor protector. The method comprises: receiving, from a measuring unit of the motor protector, electric parameters of a motor; determining, based on the electric parameters, whether the motor experiences a first failure related to overheating of the motor; enabling, in accordance with determination of the first failure of the motor, the power supply unit to power a closing mechanism of the motor protector after a predetermined time, such that the closing mechanism is closed to power the motor via the power supply lines; determining, based on the electric parameters, whether the motor experiences a second failure different from the first failure; and enabling, in accordance with determination of the second failure of the motor, the power supply unit to stop powering the closing mechanism.

In some embodiments of the present disclosure, the second failure may include at least one of grounding-related failure and open phase-related failure of the motor.

In some embodiments of the present disclosure, the method may comprise: enabling an energy-storage capacitor of the power supply unit to power the closing mechanism.

In some embodiments of the present disclosure, the method may comprise: sending an enabling signal to a reclosing unit of the motor protector to enable the energy-storage capacitor to power the closing mechanism; and sending a disabling signal to the reclosing unit to stop the energy-storage capacitor from powering the closing mechanism.

In some embodiments of the present disclosure, the enabling signal may enable the reclosing unit to automatically initiate the energy-storage capacitor to power the closing mechanism after a predetermined time.

In some embodiments of the present disclosure, the method may further comprise: determining the predetermined time by discharging power of the energy-storage capacitor.

In some embodiments of the present disclosure, the method may further comprise: receiving, from a storage unit, a previous thermal state parameter of the motor when the power supply lines stop powering the motor; receiving, from a timing circuit, a period of time elapsed since the power supply lines stop powering the motor; and determining the first failure based on the previous thermal state parameter, the period of time elapsed and the electric parameters In some embodiments of the present disclosure, the method may further comprise: executing an initialization operation after receiving electric power from the power supply unit, to receive the previous thermal state parameter and the period of time elapsed respectively from the storage unit and the timing circuit.

In some embodiments of the present disclosure, the method further comprises: periodically receiving the electric parameters and determining whether the failure occurs in the motor.

In some embodiments of the present disclosure, the power supply unit may be enabled, in accordance with determination of at least one of the first failure and the second failure, to power a tripping mechanism of the motor protector, thereby stopping powering the motor via the power supply lines.

The motor protector and the method for operating the motor protector in accordance with embodiments of the present disclosure discriminate type of the motor failures via the controller and decide, based on the result of the failure determination, whether the power supply unit supplies power to the closing mechanism. When the motor experiences the first failure related to overheating, the power supply unit is enabled to power the closing mechanism of the motor protector after a predetermined time, to implement a reclosing operation of the motor protector. When the motor experiences a second failure different from the first failure, the power supply unit stops powering the closing mechanism to prohibit the reclosing operation of the motor protector. In this way, the motor protector can discriminate the failure types and initiate the reclosing operation merely in the event of the overheating failure of the motor, to avoid secondary damage to motor components caused by initiating the reclosing operation under other failures.

BRIEF DESCRIPTION OF THE DRAWINGS

Through the following detailed description with reference to the accompanying drawings, the above and other objectives, features, and advantages of the embodiments of the present disclosure will be more easily understood. In the drawings, a plurality of embodiments of the present disclosure are explained in an exemplary and non-restrictive manner, wherein.

DETAILED DESCRIPTION OF EMBODIMENTS

Figure 1:
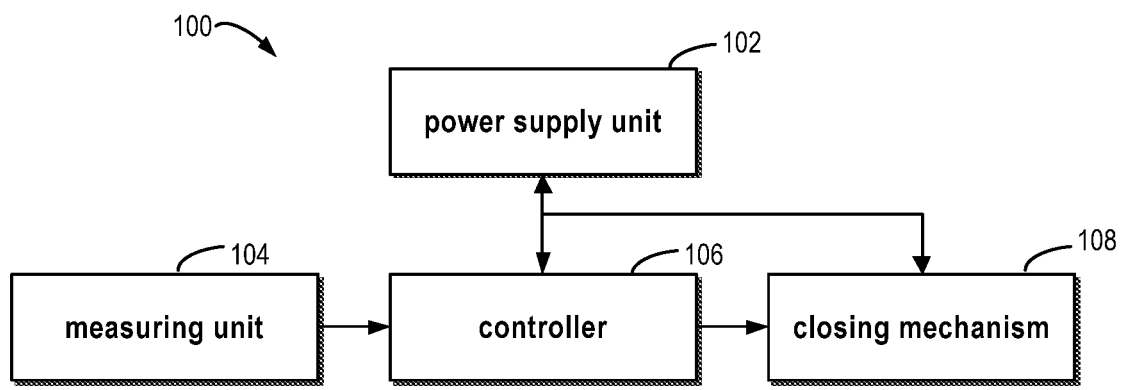
FIG. 1 illustrates a structure diagram of a motor protector in accordance with one example embodiment of the present disclosure.

Principles of the present disclosure are now explained with reference to various example embodiments shown in the drawings. It should be appreciated that description of those embodiments is merely to enable those skilled in the art to better understand and further implement the present disclosure and is not intended for limiting the scope disclosed herein in any manner. It should be noted similar or same reference signs can be used in the drawings where feasible, and similar or same reference signs can represent similar or same functions. Those skilled in the art will easily recognize from the following description that alternative embodiments of the structure and method described in the text can be adopted without deviating from the principles of the present invention described herein.

The motor protector and the method for operating the same in accordance with embodiments of the present disclosure are explained in details below with reference to the drawings.

FIG. 1 illustrates a motor protector in accordance with one example embodiment of the present disclosure. As shown in FIG. 1, the motor protector 100 includes: a power supply unit 102, a measuring unit 104 and a controller 106.

The power supply unit 102 is adapted to receive electric power from power supply lines of the motor to power the motor protector 100, 200. In some embodiments, the power supply unit 102 may include a current transformer adapted to draw electric power from the power supply lines of the motor, so as to supply the electric power to respective power consuming units of the motor protector directly or indirectly via the current transformer. As the power requirement may differ from one unit to another in the motor protector, in some embodiments, the power supply unit 102 may also include an energy-storage circuit and/or an energy-storage capacitor. In some embodiments of the present disclosure, the power supply unit 102 may include an energy-storage capacitor configured to power a closing mechanism 108. During operation of the motor protector, the current transformer may charge the energy-storage capacitor which stores the electric power, and determines, in accordance with failure type determined by the controller, whether the energy-storage capacitor supplies the electric power to the closing mechanism 108. After receiving the electrical power from the energy-storage capacitor, the closing mechanism 108 performs a closing operation on the motor.

The measuring unit 104 is adapted to measure electric parameters of the motor. In some embodiments, the measuring unit 104, for example, may be adapted to measure electric parameters associated with overheating, grounding and/or open-phase failure of the motor. Since the acts of the motor in case of overheating, grounding and/or open-phase failure are well known in the art, the detailed description of the electric parameters associated with the above failures is omitted.

The controller 106 is configured to determine the failure and control the power supply unit 102 to operate in accordance with the result of the failure determination. In one example implementation, the controller 106 is configured to receive electric parameters from the measuring unit 104. Afterwards, the controller 106 determines, based on the electric parameters, whether the motor experiences a first failure related to overheating, and enables the power supply unit 102 to power the closing mechanism 108 of the motor protector 100 after a predetermined time in response to the determination of the first failure of the motor. Accordingly, the closing mechanism 108 is closed to enable the power supply lines to power the motor. In addition, the controller 106 also determines, based on the electric parameters, whether the motor experiences a second failure different from the first failure, and enables the power supply unit 102 to stop powering the closing mechanism 108 in response to the determination of the second failure of the motor.

The motor protector 100 in accordance with embodiments of the present disclosure determines the failure type of the motor via the controller 106 and decides, based on the result of the failure determination, whether the power supply unit 102 supplies power to the closing mechanism 108. When the motor experiences the first failure related to overheating, the power supply unit 102 is enabled to power the closing mechanism 108 of the motor protector 100 after a predetermined time, to implement a reclosing operation of the motor protector. When the motor experiences the second failure different from the first failure, the power supply unit 102 stops powering the closing mechanism 108 to prohibit reclosing operation of the motor protector. In this way, the motor protector can discriminate the failure and initiate the reclosing operation only in the event of the overheating failure of the motor, thus to avoid secondary damage to motor components caused by initiating the reclosing operation under other failures.

It is to be understood that the first failure and the second failure are not sequentially determined in the embodiments. For example, in some embodiments, the determination of the first failure is performed after the second failure has already been determined. In some embodiments, the first failure and the second failure may be determined in parallel.

Figure 2:
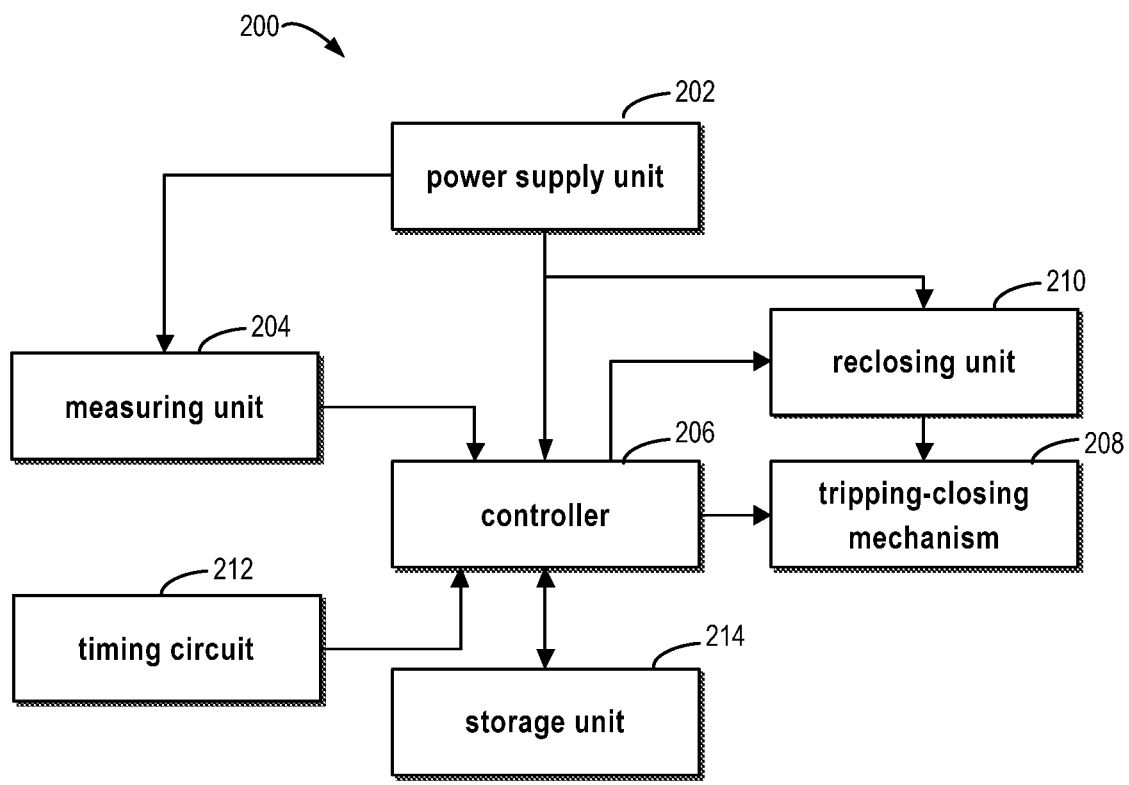
FIG. 2 illustrates a structure diagram of a motor protector in accordance with a further example embodiment of the present disclosure.

FIG. 2 illustrates a motor protector in accordance with a further example embodiment of the present disclosure. As shown in FIG. 2, the motor protector 200 includes: a power supply unit 202, a measuring unit 204 and a controller 206. Considering these components are similar to the power unit 102, measuring unit 104 and controller 106 of the motor protector 100 in the previous embodiments, the present disclosure omits the detailed description of the components and instead focuses on differences between the following embodiments and the previous ones.

As shown in FIG. 2, the motor protector 200 also may include a reclosing unit 210 configured to power the closing mechanism 208 in response to an enabling signal from the controller 206 and to stop powering the closing mechanism 208 in response to a disabling signal from the controller 208. In some embodiments, the power supply unit 202 may include the energy-storage capacitor. Besides, the reclosing unit 201 may control the energy-storage capacitor to power the closing mechanism 208 in response to the enabling signal from the controller 206 and stop the energy-storage capacitor from powering the closing mechanism 208 in response to the disabling signal from the controller 206. By virtue of the reclosing unit 210, configuration and/or structure of the motor protection 200 may be simplified and the complexity of the circuit may be reduced.

In the illustrated embodiment, the closing mechanism 208 is indicated in the form of a tripping-closing mechanism 208 which is merely illustrative as an example. It should be understood that the tripping-closing mechanism 208 in use can perform either a tripping operation or a closing operation. In other embodiments, the closing mechanism 208 may be configured and driven independent with the tripping mechanism. The detailed description of the tripping-closing mechanism 208 is omitted here as it is well known in the art.

In some embodiments of the present disclosure, the reclosing unit 210 may include an automatic reclosing unit. In some embodiments, the automatic reclosing unit may be implemented in a variety of forms. The automatic reclosing unit may be configured to: automatically enable the energy-storage capacitor to power the closing mechanism 208 after a predetermined time in response to an enabling signal from the controller 206. In such a case, control complexity of the controller may be reduced and the configuration and/or structure of the motor protection 200 may be further simplified. In some embodiments, the automatic reclosing unit is implemented in the form of a circuit.

In some embodiments of the present disclosure, the automatic reclosing unit may include a timing circuit that is configured, to time by discharging the power of the energy-storage capacitor, to, for example, determine the predetermined time. In some embodiments, after a tripping failure of the motor, for example upon the controller 206 determining an overheating failure of the motor, the timing circuit starts to operate and times by discharging the energy-storage components (e.g., energy-storage capacitor in some embodiments) in the power unit 202. When the electric power of the energy-storage components reaches a predetermined threshold (i.e., the predetermined time elapses), the automatic reclosing unit automatically starts to power the reclosing mechanism 208, to perform the reclosing operation. In this way, the timing function can be realized by a simple circuit.

As shown in FIG. 2, in some embodiments of the present disclosure, the motor protector 200 also may include a storage unit 214 configured to store a previous thermal state parameter of the motor when the power supply lines stop powering the motor and a timing circuit 212 configured to determine a period of time elapsed since the power supply lines stop powering the motor. Related parameters for determining the overheating failure of the motor may be provided by means of the configured storage unit 214 and the timing circuit 212. It is to be understood that the implementation is merely exemplary and those skilled in the art may envisage other implementations for determining the overheating failure.

In some embodiments of the present disclosure, the controller 206 may be configured to perform an initialization operation in response to start-up of the power supply and to receive previous thermal state parameters and elapsed period of time from the storage unit 214 and the timing circuit 212 respectively. Power supply of the motor protector 200 in accordance with embodiments of the present disclosure depends on the power supply lines of the motor and the electric power is also received from the power supply lines. As stated above, the controller 206 is not initiated until the power supply unit 202 of the motor protect comes into operation. In some embodiments, immediately after the power supply unit 202 of the motor protector 200 supplies power to the controller 206, the controller 206 is initiated. After that, the controller 206 receives the previous thermal state parameter and the elapsed period of time via the initialization operation from the storage unit 214 and the timing circuit 212 respectively. Therefore, operating efficiency of the motor protector 200 is improved. Delay of the failure protection is avoided since the related parameters are not read at the time when the controller 200 determines a failure. It is to be appreciated that the above approach also can fulfill the object of the present disclosure.

In some embodiments, the controller 206 may be configured to periodically receive the electric parameters and determine whether the motor experiences a failure after the initialization operation. Hence, the operating efficiency of the motor protector is improved. Moreover, the failure is determined as soon as it occurs and a corresponding act is accordingly adopted to enhance response speed of the motor protector.

In some embodiments of the present disclosure, the controller 206 also may be configured to: enable the power supply unit 202 to power the tripping mechanism of the motor protector 200 in response to determining at least one of the first and second failures, wherein the tripping mechanism is configured to enable, in response to being powered, the power supply lines to stop powering the motor. In this case, the tripping act is executed in the event of the failure of the motor. Although the closing mechanism and the tripping mechanism are illustrated as one module in the embodiment of FIG. 2, it is to be understood that they may be operated independent with each other. The detailed description of the closing mechanism and the tripping mechanism of the motor protector is omitted here as it is well known in the art.

Additionally, in some embodiments, the motor protector 200 automatically performs function of motor protection. In some embodiments not shown, the motor protector 200 also may include a manual operation mode. For example, the motor protector 200 may include a human-machine interface (not shown), through which the users may set the motor protector to select an operation mode of the motor initiator. For example, when the users select the manual mode, the controller of the motor initiator may not execute the automatic closing function. In such a case, the users may perform a manual operation on the motor protector to close the closing mechanism. In addition, the motor protector 200 executes the closing function described herein only when the users set an automatic mode. In some embodiments, the users may configure the motor protector to choose the type of the motor and the motor protector may determine closing timing of the motor according to the type of the motor. It should be understood that the human-machine interface here is just an example and the motor protector may utilize other input/output devices known to those skilled in the art.

Figure 3:
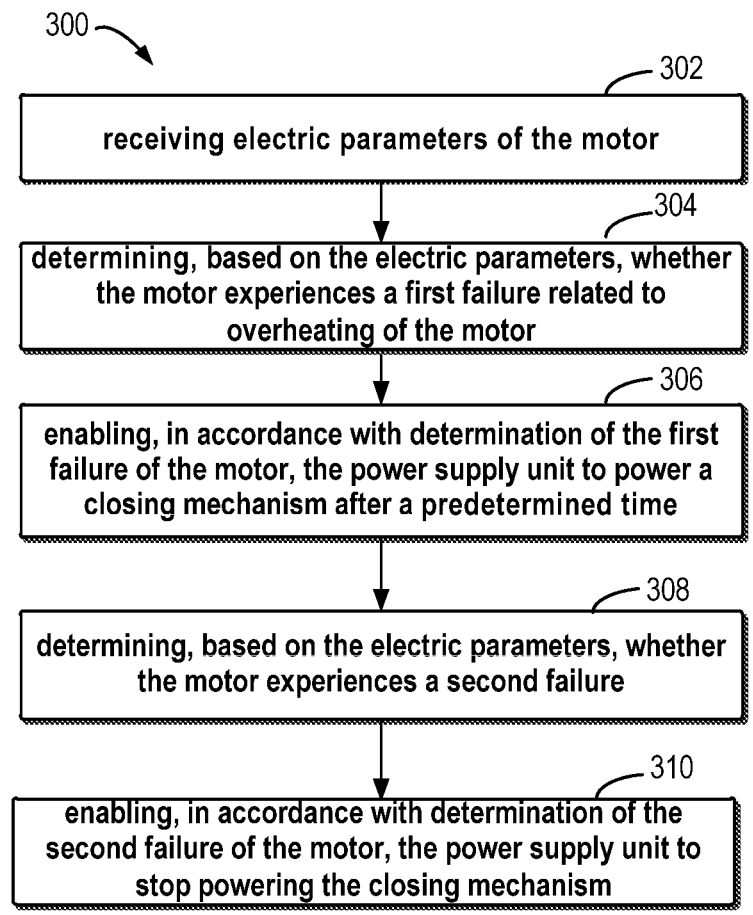
FIG. 3 illustrates a schematic flowchart of a method for operating the motor protector in accordance with one example embodiment of the present disclosure.

FIG. 3 illustrates a schematic flowchart of a method 300 for operating the motor protector in accordance with one example embodiment of the present disclosure. The method 300 for operating the motor protector as shown in FIG. 3 may be executed by the controller 106, 206 or other suitable devices. To facilitate description, the method 300 is described below in conjunction with the motor protector 200 in FIG. 2.

The method 300 starts at block 302, at which the controller 206 receives electric parameters of the motor from the measuring unit 204 of the motor protector 200. In some embodiments, the measuring unit 204 is adapted to measure electric parameters associated with overheating, grounding and/or open phase failures of the motor. Accordingly, the controller 206 may receive, from the measuring unit 204, the electric parameters associated with a variety of failures of the motor.

At block 304, the controller 206 determines, based on the electric parameters, whether the motor experiences a first failure related to the overheating. At block 306, in response to the determination of the first failure of the motor, the controller 206 enables the power supply unit 202 to power the closing mechanism of the motor protector after a predetermined time, such that the closing mechanism can be closed and the motor can be powered by the power supply lines. In the event of the first failure of the motor, the closing operation may be executed after a predetermined time, to reinitiate the motor. At block 308, the controller 206 determines, based on the electric parameters, whether the motor experiences a second failure different from the first failure. In some embodiments, the second failure may include at least one of the grounding-related and open phase-related failures of the motor. At block 310, in response to the determination of the second failure of the motor, the controller 206 enables the power supply unit 202 to stop powering the closing mechanism. In the event of the second failure of the motor, the power supply to the closing mechanism is cut off to prevent the motor from initiating.

As described above, the method for operating the motor protector in accordance with embodiments of the present disclosure determines a failure type of the motor and decides, based on the result of the failure determination, whether the power supply unit powers the closing mechanism. In case of the first failure related to the overheating of the motor, the power supply unit is enabled to power the closing mechanism of the motor protector after a predetermined time to implement a reclosing operation of the motor protector. In the event of the second failure different from the first failure, the power supply unit is enabled to stop powering the closing mechanism to prohibit the reclosing operation of the motor protector. Thus, the motor protector discriminates the failures and initiates the reclosing operation merely in the event of the overheating failure of the motor, to avoid secondary damage to motor components caused by initiating the reclosing operation under other failures.

Moreover, although the blocks 308 and 310 are executed after blocks 304 and 305 in the illustrated embodiment, it should be understood that the above sequence is non-limited. The first failure and the second failure may not be sequentially determined. By way of example, in some embodiments, the determination of the first failure may be performed after the second failure has already been determined. In some embodiments, the first failure and the second failure may be determined in parallel. In addition, those skilled in the art may perform other implementations different from the above embodiments based on the type of the processor or the implementation of the specific algorithm.

Figure 4:
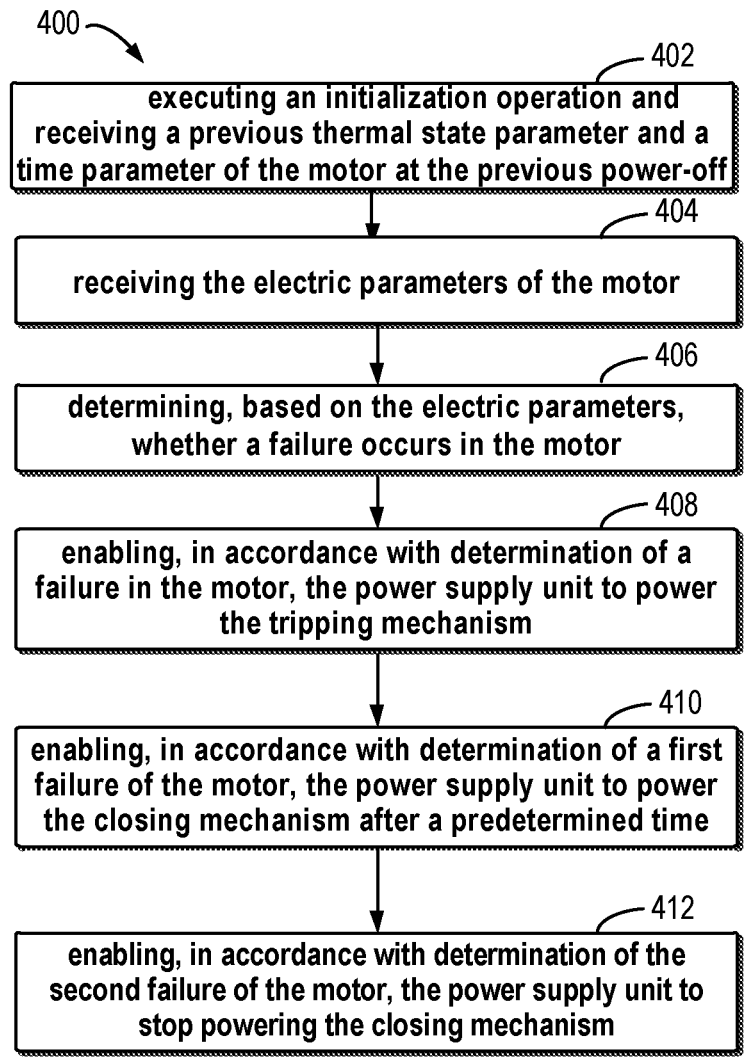
FIG. 4 illustrates a schematic flowchart of a method for operating the motor protector in accordance with a further example embodiment of the present disclosure.

FIG. 4 illustrates a schematic flowchart of the method for operating the motor protector in accordance with a further example embodiment of the present disclosure. The method 400 for operating the motor protector as shown in FIG. 4 may be executed by the controller 106, 206 or other suitable devices. To facilitate description, the method 400 is described below in conjunction with the motor protector 200 in FIG. 2.

The method 400 starts at block 402, at which the controller 206 performs the initialization operation, in which the controller 206 receives a previous thermal state parameter and a time parameter of the motor at the previous power-off.

In some embodiments, the controller 206 receives, from the storage unit 214, the previous thermal state parameter of the motor when the motor is stopped being powered via the power supply lines and, a period of time elapsed, from the timing circuit 212, since the power supply lines stop powering the motor.

In the motor protector in accordance with the embodiments of the present disclosure, the controller 206 is not initiated until it is powered by the power supply unit 202. After the initiation of the controller 206, the previous thermal state parameter and the period of time elapsed are received, from the storage unit 214 and the timing circuit 212 respectively, via the initialization operation, to improve operating efficiency of the motor protector 200. Besides, delay of the failure protection is also avoided since the related parameters would not be not read when the controller 200 determines a failure.

At block 404, the controller 206 receives, from the measuring unit 204 of the motor protector, the electric parameters of the motor; at block 406, the controller 206 determines, based on the electric parameters, whether a failure occurs in the motor. In some embodiments, the failure type also may be determined at block 404. Furthermore, in response to the determination of the failure, the controller 206 enables, at block 408, the power supply unit 202 to power the tripping mechanism of the motor protector. Therefore, the power supply lines stop powering the motor and the motor is switched off by the tripping mechanism.

At block 410, in according with the determination of the first failure of the motor, the controller 206 enables the power supply unit 202 to power the closing mechanism of the motor protector after a predetermined time, such that the closing mechanism is closed and the motor is powered by the power supply lines. In the event of the first failure of the motor, the closing operation may be executed after a predetermined time, to reinitiate the motor. In some embodiments, the method 400 for operating the motor protector also includes determining the first failure based on the previous thermal state parameter, the period of time elapsed and the electric parameters.

At block 412, in response to the determination of the second failure of the motor, the power supply unit 202 is enabled to stop powering the closing mechanism. In some embodiments, the second failure may include at least one of the grounding-related and open phase-related failures of the motor.

Although the blocks 410 and 412 are executed after the block 408 in the illustrated embodiment, it should be understood that the above sequence is merely exemplary. In some embodiments, the block 408 may be executed after the blocks 410 and 412. Similar to the aforementioned embodiment, there are no specific requirements for the execution sequence of the blocks 410 and 412. Those skilled in the art may perform other implementations different from the above embodiments based on the type of the processor or the implementation of the specific algorithm. In some embodiments of the present disclosure, the method 400 also may include: periodically receiving the electric parameters and determining whether a failure occurs in the motor. Therefore, the motor protector can monitor the failure of the motor in real time.

In some embodiments, the energy-storage capacitor of the power supply unit 202 is enabled to power the closing mechanism. Under such a circumstance, control method of the closing mechanism also may include: sending an enabling signal to the reclosing unit 210 of the motor protector to enable the energy-storage capacitor to power the closing mechanism; and sending a disabling signal to the reclosing unit 210 to stop the energy-storage capacitor from powering the closing mechanism. By virtue of the reclosing unit 210, configuration and/or structure of the motor protection 200 may be simplified and the complexity of the circuit may be reduced.

In some embodiments of the present disclosure, the automatic reclosing unit may include a timing circuit that is configured to time by discharging the power of the energy-storage capacitor. In this case, the complexity of the controller may be reduced and the configuration and/or structure of the motor protector 200 may be further simplified. In some embodiments of the present disclosure, the method also may include: enabling the energy-storage capacitor to power the closing mechanism in response to a remaining power of the discharged energy-storage capacitor being lower than a predetermined threshold.

The operations of the motor protector may be executed by one or more processors. In different applications, the controller may be implemented by hardware, software or combinations thereof. For example, in some implementations, the controller may include one or more CPU or processors having an associated memory. As a further example, the controller may include other circuits operated by hardware or software. For example, the circuits may include one or more of: field programmable gate array (FPGA), application-specific integrated circuit (ASIC), complex programmable logic device (PLD), complex programmable logic device (CPLD), programmable logic array (PLA), programmable array logic (PAL) or other similar processing devices or circuits. As another example, the controller may include combinations of the circuit and one or more processors.

Although various examples of the techniques disclosed herein have been described above, it is to be understood that the examples are non-restrictive. Likewise, each drawing may depict the example architecture or other configurations of the techniques disclosed herein to facilitate understanding features and functions that may be included in the disclosure. The techniques disclosed herein are not limited to the illustrated example architecture or configurations. Instead, the expected features may be fulfilled using multiple alternative architecture and configurations. In fact, those skilled in the art can easily conceive the ways for achieving the alterative functions, logics or physical partitioning and configurations to implement the expected features of the techniques disclosed herein. Besides, many different composite modules, in addition to the modules described herein, may be applied to various partitions. Additionally, as to the flowchart, operating instructions and method claims, the various examples shall not be required to perform the listed functions in the same sequence as indicated in the text unless indicated otherwise.

Although the techniques in the present disclosure have been described in accordance with a variety of examples and implementations, it should be appreciated that features, aspects and functionality described in one or more individual examples are not restricted to the example(s) and can be applied individually or in combination into one or more of the other examples in accordance with the present disclosure despite that the example(s) has been described or not and the features have been demonstrated as a part of the example(s) or not. Therefore, the scope of techniques disclosed herein should note be limited to any one of the above examples. Moreover, all combinations of the above concepts (assuming they do not contradict with each other) should be understood as a part of the theme of the present invention. To be specific, all combinations of the themes sought for protection at the end of the disclosure are construed as a part of the theme of the present invention.

Unless clearly indicated, the terms, phrases and variants thereof used herein are to be read as open-ended terms, rather than restrictive. The term "includes/comprises" is to be read as "includes/comprises, but is not limited to." The term "example" is used for providing exemplary instances of the discussed item, rather than being exhaustive and restrictive. The term "one" is to be read as "at least one" or "one or more" etc. The term "includes/comprises" is an open-ended term that include any other elements besides the listed ones. In the text, the techniques obvious or known to those ordinary skilled in the art in fact refer to the techniques that are already known or to be known in any time of the future. When applicable, the terms "first," "second" and "third" are used to indicate each object as an individual entity without suggesting any temporal sequence, unless clearly indicated otherwise.

Those skilled in the art should understand that the above explanation is provided as examples only and the present invention may be implemented by other implementations without the above details. Besides, the unnecessary details of the existing functions and structures are omitted for the conciseness of the present invention.

Although the specific embodiments have been illustrated and described here, those skilled in the art will recognize that the displayed embodiments may be replaced by any arrangements having the same object and the present invention may be applied differently in other environments. The present application is intended to encompass any modifications or variants of the present invention and the attached claims are not intended to restrict the scope of the present invention within the specific embodiments described herein.

We claim:

1. A motor protector, comprising:
    a power supply unit adapted to receive electric power from power supply lines of a motor to power the motor protector;
    a measuring unit adapted to measure electric parameters of the motor; and
    a controller configured to at least perform steps of:
        receiving from the measuring unit the electric parameters;
        determining, based on the electric parameters, whether the motor experiences a first failure related to overheating of the motor;
        enabling, in accordance with determination of the first failure of the motor, the power supply unit to power a closing mechanism of the motor protector after a predetermined time, such that the closing mechanism is closed to power the motor via the power supply lines;
        determining, based on the electric parameters, whether the motor experiences a second failure different from the first failure; and
        enabling, in accordance with determination of the second failure of the motor, the power supply unit to stop powering the closing mechanism,
    wherein the power supply unit includes an energy-storage capacitor configured to power the closing mechanism; and
    wherein the motor protector further comprises a reclosing unit configured to control the energy-storage capacitor to power the closing mechanism in response to an enabling signal from the controller, and to enable the energy-storage capacitor to stop powering the closing mechanism in response to a disabling signal from the controller.

2. The motor protector of claim 1, wherein the second failure includes at least one of grounding-related failure and open phase-related failure of the motor.

3. The motor protector of claim 1, wherein the reclosing unit includes an automatic reclosing unit configured to: automatically initiate the energy-storage capacitor to power the closing mechanism after a predetermined time in response to the enabling signal from the controller.

4. The motor protector of claim 3, wherein the automatic reclosing unit includes a timing circuit configured to time by discharging power of the energy-storage capacitor.

5. The motor protector of claim 1, further comprising:
    a storage unit configured to store a previous thermal state parameter of the motor when the power supply lines stop powering the motor; and
    a timing circuit configured to determine a period of time elapsed since the power supply lines stop powering the motor.

6. The motor protector of claim 5, wherein the controller is configured to execute an initialization operation in response to start of power supply, so as to receive the previous thermal state parameter and the period of time elapsed respectively from the storage unit and the timing circuit.

7. The motor protector of claim 6, wherein the controller is configured to periodically receive the electric parameters and determine whether the failure occurs in the motor.

8. The motor protector of claim 1, wherein the controller is further configured to:
    enable, in accordance with determination of at least one of the first failure and the second failure, the power supply unit to power a tripping mechanism of the motor protector, wherein the tripping mechanism is configured to, in response to being powered, stop powering the motor via the power supply lines.

9. A method for operating a motor protector, comprising:
    receiving, from a measuring unit of the motor protector, electric parameters of a motor;
    determining, based on the electric parameters, whether the motor experiences a first failure related to overheating of the motor;
    enabling, in accordance with determination of the first failure of the motor, the power supply unit to power a closing mechanism of the motor protector after a predetermined time, such that the closing mechanism is closed to power the motor via the power supply lines;
    determining, based on the electric parameters, whether the motor experiences a second failure different from the first failure;
    enabling, in accordance with determination of the second failure of the motor, the power supply unit to stop powering the closing mechanism;
    enabling an energy-storage capacitor of the power supply unit to power the closing mechanism;
    sending an enabling signal to a reclosing unit of the motor protector to enable the energy-storage capacitor to power the closing mechanism; and
    sending a disabling signal to the reclosing unit to stop the energy-storage capacitor from powering the closing mechanism.

10. The method of claim 9, wherein the second failure includes at least one of grounding-related failure and open phase-related failure of the motor.

11. The method of claim 9, wherein the enabling signal enables the reclosing unit to automatically initiate the energy-storage capacitor to power the closing mechanism after a predetermined time.

12. The method of claim 11, further comprising:
- determining the predetermined time by discharging power of the energy-storage capacitor.

13. The method of claim 9, further comprising:
- receiving, from a storage unit, a previous thermal state parameter of the motor when the power supply lines stop powering the motor;
- receiving, from a timing circuit, a period of time elapsed since the power supply lines stop powering the motor; and
- determining the first failure based on the previous thermal state parameter, the period of time elapsed and the electric parameters.

14. The method of claim 13, further comprising:
- executing an initialization operation after receiving electric power from the power supply unit, to receive the previous thermal state parameter and the period of time elapsed respectively from the storage unit and the timing circuit.

15. The method of claim 14, further comprising:
- periodically receiving the electric parameters and determining whether the failure occurs in the motor.

16. The method of 9, further comprising:
- enabling, in accordance with determination of at least one of the first failure and the second failure, the power supply unit to power a tripping mechanism of the motor protector, thereby stopping powering the motor via the power supply lines.

* * * * *